Nov. 25, 1958 S. G. BEST 2,861,637
TURBOPROP FUEL CONTROL
Filed Dec. 21, 1954
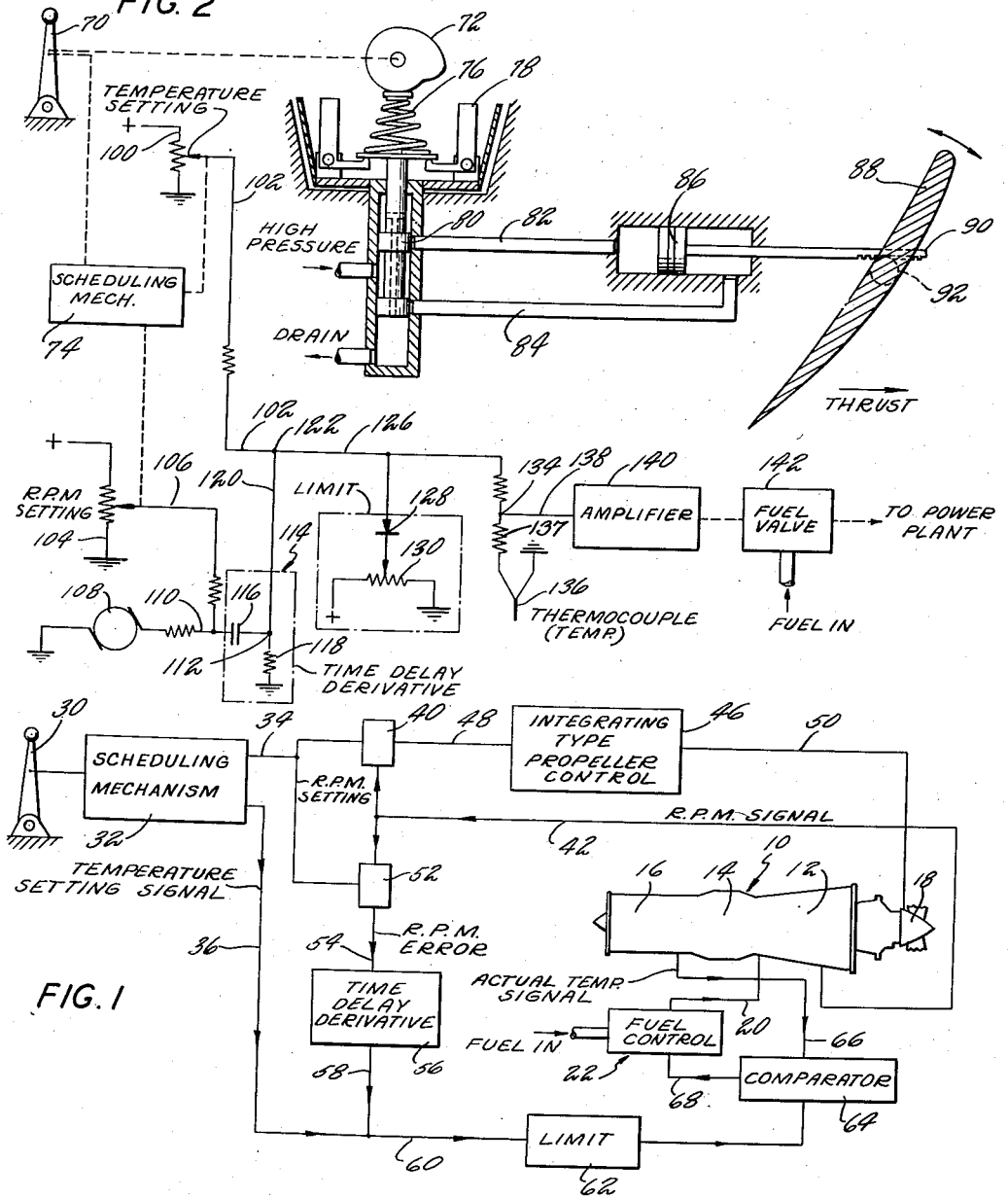
INVENTOR
STANLEY G. BEST
BY
ATTORNEY

United States Patent Office 2,861,637
Patented Nov. 25, 1958

2,861,637
TURBOPROP FUEL CONTROL

Stanley G. Best, Manchester, Conn., assignor to United Aircraft Corporation, East Hartford, Conn., a corporation of Delaware Application December 21, 1954, Serial No. 476,646

3 Claims. (Cl. 170—135.72)

This invention relates to fuel controls and more particularly to fuel controls for turboprop power plants.

It is an object of this invention to provide a fuel control for a turboprop power plant which is primarily a power plant temperature control device.

It is a further object of this invention to provide a fuel control of the type described which includes means for permitting maximum acceleration by permitting temperature to rise to its limit during acceleration.

It is another object of this invention to provide a fuel control for a turboprop power plant having means for providing a temporary false signal to the metering mechanism during acceleration to permit the power plant to operate at its maximum permissible temperature over the speed range.

It is a still further object of this invention to provide a single power plant operated propeller and fuel control with the fuel control comprising a temperature responsive device biased by a temporary droop signal, i. e., a relatively long time constant derivative, and including a maximum limit on the temperature setting.

These and other objects of this invention will become readily apparent from the following detail description of the drawing in which:

Fig. 1 is a block diagram of the control system; and
Fig. 2 is a schematic illustration of one form which the invention may take.

In the control of gas turbine engine and propeller combination it is highly desirable to operate on a fixed temperature vs. R. P. M. schedule. This schedule is determined by the particular engine design so that maximum economy of operation is obtained. The most direct means of accomplishing this is to control both temperature and R. P. M. A simple control in such an event compares the actual turbine temperature with the desired temperature or temperature setting and adjusts fuel flow until the two are equal. At the same time the speed of the power plant is controlled by giving a particular speed setting to the variable pitch propeller. However, in a turbine and propeller combination in which temperature is controlled by means of fuel flow, some conditions exist under which the system becomes statically unstable when the propeller blade angle is held constant and dynamically unstable when a propeller governor is used as in the case of a variable pitch propeller, or the system may approach these conditions and give marginal stability.

This invention, therefore, uses a temporary R. P. M. droop signal to vary the temperature called-for signal in order to provide stable operation or more stable operation in conjunction with a propeller governor. In this system the temporary R. P. M. droop is a relatively long time constant derivative of R. P. M. error. The long time constant is desirable so that the temperature called for is held at its maximum limit for the entire duration of the acceleration period. Of course, temperature limiting is provided for so that the maximum permissible temperature for the engine is not exceeded.

Referring to Fig. 1, a turboprop power plant combination 10 is illustrated as having a compressor section 12, a combustion section 14 and a turbine and exhaust section 16. A number of turbine stages may be used so that one portion drives the compressor and the other portion drives a variable pitch propeller 18. The variable pitch propeller and control therefor may be of the type shown and described in Caldwell et al. Patent No. 2,174,717 and Martin Patent No. 2,361,954. Fuel is fed to the combustion section 10 by a line 20 which leads from a fuel control generally indicated at 22. The fuel control may comprise a simple electrically actuated valve or it may be of the type illustrated and described in Patent No. 2,796,753, issued on June 25, 1957, to David R. Pearl et al. The general operation of the fuel control and propeller control may be simply described by referring to the remainder of the block diagram shown in Fig. 1. A single pilot's control lever 30 is shown as being capable of passing a signal to a coordinating or scheduling mechanism 32. This device is merely a mechanical linkage which can produce proportional values of R. P. M. setting and temperature setting via the lines 34 and 36, respectively. In other words, the signal strength, or in a mechanical system the amount of movement to produce a given speed setting, may not necessarily be identical to the same signal or movement desired for the temperature signal. However, the coordinating or scheduling mechanism provides proportionality of motion, i. e., for a given speed setting a predetermined temperature setting is obtained. The R. P. M. setting signal passes via the line 34 to a comparing device 40 which compares the desired speed setting with the actual R. P. M. signal received from the power plant via the line 42. This signal is passed to an integrating type propeller control generally illustrated by the block 46 which in turn passes a signal to control the pitch of the blades of the propeller 18. Thus a speed error signal passes via the line 48 to the control 46 and then via the line 50 a signal is passed to the propeller pitch changing mechanism. The speed error device and the propeller control may be of the well known governor type such as that shown in Fig. 2. A speed setting signal is also sent to the comparator 52 which receives an actual R. P. M. signal via the line 42 and then passes a speed error signal via the line 54 to the long time constant derivative mechanism indicated by box 56. The speed setting signal passing via the line 36 is biased by the signal flowing from the mechanism 56 via the line 58.

The device for providing the long time constant derivative is intended to operate as follows. Should the power lever be suddenly moved forward toward an increased speed and increased temperature setting, it is desirable to accelerate the power plant as rapidly as possible. Therefore, although a certain higher temperature is now called for by a signal passing via the line 36 a temporary signal will be generated by the device 56 so that for a period of time a signal will be passed through the line 60 which signal will be calling for a higher temperature than that now being called for in the signal passing through the line 36. This signal is passed through a limiting mechanism 62 which will put a maximum limit on the signal for that duration of acceleration. This signal is then passed to the comparator 64 which compares the temperature setting signal with the actual temperature signal coming from the line 66. A final signal is then passed via the line 68 to the fuel control 22 and fuel flow is adjusted accordingly.

Fig. 2 represents a schematic electrical and hydraulic system showing one form which this invention may take. Thus as illustrated a single pilot's control lever 70 is shown as being operatively connected both to a speed setting cam 72 and a scheduling mechanism 74. The scheduling mechanism 74 is again similar to the scheduling mechanism 32 described in connection with Fig. 1. The speed setting cam 72 operates to set the compression on a speeder spring 76 which is engaged at the bottom thereof by flyweights 78.

The element or box 40 of Fig. 1 which is described above as a comparing device is represented by the mechanism in Fig. 2 as follows. Thus box 40 is equivalent to the speed setting cam 72, the speeder spring 76 and the flyweights 78. The flyweights 78 are driven proportional to engine speed in any well known manner so that any variations from the given speed setting will cause vertical motion of the pilot valve 80 which in turn will control the flow of high pressure and drain fluid to the lines 82 and 84 to vary the position of the servomotor 86 which in turn varies the pitch of the propeller blade 88 by any suitable means. For simplicity a rack 90 and a pinion 92 are shown herein. The element or box 46 of Fig. 1 which is described above as an integrating type propeller control is represented by mechanism in Fig. 2 as follows. Thus element or box 46 is equivalent to the pilot valve 80, the servomotor 86, pressure and drain lines 82 and 84 and the usual well-known elements for changing propeller pitch. The scheduling mechanism 74 is operatively connected to a temperature setting slider or potentiometer 100. The potentiometer is provided with a suitable source of D. C. power so that at varied positions of the pick-off a different signal strength is provided in the line 102. The scheduling mechanism 74 also is operatively connected to a slider 104 which will produce a signal in the line 106 commensurate with the desired speed setting. A speed responsive generator 108 is driven proportional to engine speed to provide an actual speed signal in the line 110. These signals are compared at 112 and then a speed error signal is passed into the mechanism which provides the relatively long time constant derivative of R. P. M. error. This mechanism is generally indicated at 114 and comprises a condenser 116 and a resistance 118. The signal passing from the line 120 then will combine with the temperature setting signal from the line 102 at the juncture 122 so that for a period of time, dependent upon the rate of power lever change and dependent upon the capacitance of the condenser 116, a desired speed setting will be fed into the line 126 which, in an increase fuel flow direction, will be higher than the desired new speed setting signal passing to the line 102. In order that this signal does not exceed the maximum permissible for the particular power plant a limiting device shunts the line 126. This device comprises a rectifier 128 and a potentiometer 130. A potentiometer can be adjusted to give a particular limit or the limit may be a variable one scheduled in accordance with speed and compressor inlet temperature. A variable limiting device of this sort is disclosed in Patent No. 2,697,908 issued December 28, 1954, to Franklin F. Offner. The desired temperature setting is then compared at the junction 134 with the actual temperature signal provided by the thermocouple 136. A resistor 137 is provided to insure a signal of practical magnitude at junction 134. A temperature error signal is then passed via the line 138 to an amplifier 140 as desired and then a signal is passed to the fuel control or fuel valve 142 to vary its position in accordance with the value and polarity of the final signal.

The element or box 64 of Fig. 1 which is described above as a comparator is represented by mechanism in Fig. 2 as follows. The box 64 is equivalent to the two resistors which have their junction at point 134. The first resistor (above junction 134) is connected in series in line 126. The second resistor 137 is connected in series from the thermocouple 136. The thermocouple itself is not considered as part of the "comparator 64" but merely supplies a signal to be compared.

It will be apparent that the use of proper compensation in the fuel control according to this invention will permit a high sensitivity temperature control. This in turn means that the actual temperature of the turbine will always be substantially equal to the value called for by the combined temperature setting and temporary droop signals. Although there may be some dynamic error, a high sensitivity temperature control will make any such dynamic error exceedingly small. This control system will cause the temperature to increase to the maximum permissible during accelerations, thus achieving maximum acceleration characteristics. On the other hand during steady-state operation the temperature will always be held at the proper value for the R. P. M. at which the engine is operating.

It should be noted that the control disclosed herein may be utilized for controlling a straight jet power plant. Also, the control may control a power plant having a variable discharge nozzle. In such an instance nozzle area controls R. P. M. rather than the propeller pitch.

Although only one embodiment of this invention has been illustrated and described herein, it will be apparent that various changes and modifications may be made in the construction and arrangement of the various parts without departing from the scope of this novel concept.

What is desired to obtain by Letters Patent is:

1. In a turboprop power plant having a propeller, said propeller including variable pitch blades, means for varying the pitch of said blades including an adjustable speed responsive centrifugal governing device, in combination, means for regulating the flow of fuel to the power plant, desired power plant temperature setting means for producing a signal, manual means connected to said adjustable centrifugal governing device for creating a desired speed signal, power plant speed responsive means connected to said last-mentioned means including a generator for producing a speed error signal and for modifying said temperature signal to temporarily increase and decrease said temperature signal, said means for modifying including mechanism for defining the length of time said signal is modified, adjustable means for limiting the value of said modified signal, means responsive to a temperature at a predetermined point in the power plant for producing a second signal, means for comparing said modified signal and said second signal and producing a final signal, and means receiving said final signal for controlling said regulating means.

2. In a power plant according to claim 1 including means for simultaneously adjusting said speed responsive device and setting said temperature setting means.

3. In a turboprop power plant having a propeller, said propeller including variable pitch blades, means for varying the pitch of said blades including an adjustable speed responsive centrifugal governing device, a turbine, a compressor driving said turbine, in combination, means for regulating the flow of fuel to the power plant, desired power plant temperature setting means for producing a signal, electrical means for creating a desired turbine speed signal, a single control for operating said desired speed and desired temperature signal producing means, electrical means for sensing the actual speed and comparing it with said desired speed signal to provide a speed error signal, means for modifying said desired temperature signal including a resistance and condenser unit connecting said speed error signal means and said desired temperature setting means, said unit defining the length of time said signal is modified, means for limiting the value of said modified signal including a rectifier leading to ground, means responsive to a temperature at said turbine for producing a second signal, means for comparing said modified signal after it has been effected by said limiting means and said second signal and producing a final signal, and means receiving said final signal for controlling said regulating means.

References Cited in the file of this patent

UNITED STATES PATENTS

| | | |
|---|---|---|
| 2,632,996 | Rood | Mar. 31, 1953 |
| 2,648,194 | Jorgensen et al. | Aug. 11, 1953 |
| 2,667,228 | Wood et al. | Jan. 26, 1954 |
| 2,694,900 | Brandau | Nov. 23, 1954 |